UNITED STATES PATENT OFFICE.

EMIL WEBER, OF NEW YORK, N. Y., ASSIGNOR OF ONE-THIRD TO CHRISTIAN L. BECKER, OF NEW YORK, N. Y.

CANDY-MAKING PROCESS.

1,133,205.        Specification of Letters Patent.        Patented Mar. 23, 1915.

No Drawing.      Application filed June 19, 1914. Serial No. 846,165.

*To all whom it may concern:*

Be it known that I, EMIL WEBER, a citizen of the United States, residing at New York, in the county of New York and State of New York, have invented new and useful Improvements in Candy-Making Processes, of which the following is a specification.

This invention relates to a process for making white chocolate flavored candy and it consists in the novel features and steps hereinafter described and claimed.

An object of the invention is to provide a process for making a pure candy of white or cream color and which possesses the flavor of chocolate. At the same time the completed article as made by the process is free of fiber and insoluble matter although it is not robbed of its nutritious value.

The candy consists of three components each in turn consisting of several ingredients brought together and mingled in new and novel manner and the said components are finally brought together in novel manner whereby the completed candy is made.

The first component of the completed article is a powdered milk made in the following manner: Take two hundred quarts of fresh milk and to which add sixty pounds of granulated sugar and condense or evaporate this mixture to eighty pounds in weight. Then beat or work the said material in a mélangeur and at the same time add forty pounds of 4X sugar. This beating or working should be done while the material is maintained at a temperature of 90 degrees Fahrenheit until a flour is formed. This flour is then beaten in a room at a temperature of approximately 160 degrees for about 48 hours.

The second component which constitutes the flavor is made in the following manner: Add to ten pounds of cocoa cake from which the butter has been extracted two pounds of ground coffee, two ounces of vanilla bean and place these in a wooden vessel then add from ten to fourteen quarts of water and two quarts of pure alcohol and leave twelve hours to permit of proper fermentation. After fermentation the mixture is distilled until it amounts to two quarts of flavor.

The third component which constitutes the base of the completed article is made in the following manner. To five pounds of wheat flour add five pounds of cornstarch and roast the same in an open fire until it assumes a light yellow color. While warm add one quart of cocoa flavor to it and leave the mixture in a hot room for a period of about 12 hours until the moisture has evaporated.

After the components have been made as hereinbefore described they are brought together in the following manner: Component 2 is added to component 3 and this mixture is beaten with component 1 in a mélangeur at a heat of about 95° Farenheit. Then 14 pounds of cocoa butter is added. This mixture is then refined by being passed through a steel finisher and is then placed in a mélangeur and beaten and while being so worked ten pounds of cocoa butter is added and the material is again passed through the steel finisher. After this has been done ten pounds of cocoa butter is added as often as necessary to bring the finished product to the desired flavor.

It will therefore be seen that the product is a white, clean, pure and sanitary chocolate flavored candy and it consists only of pure milk, sugar, cocoa butter and cocoa product flavor. It is free of all fiber and insoluble stringy products and consequently is palatable and easily digested.

Having described the process what is claimed is:—

A process for making white chocolate flavored candy consisting in providing three components including the following ingredients and brought together as described the first component consisting of fresh milk and sugar beaten together and to which 4X sugar is added at 90 degrees temperature the second component consisting of chocolate cake from which the butter has been extracted, ground coffee, vanilla bean, butter and alcohol the third component consisting of wheat flour, corn starch and cocoa flavor all assembled in the manner described and approximately in the proportions named.

In testimony whereof I, affix my signature in presence of two witnesses.

EMIL WEBER.

Witnesses:
    M. E. LAUGHLIN,
    GEO. A. BYRNE.